United States Patent [19]

Hertrick et al.

[11] 3,891,164
[45] June 24, 1975

[54] DUPLEX VALVE

[76] Inventors: Thomas P. Hertrick, 859 Sherwood Drive, Elyria, Ohio 44035; James L. Mitiska, 4397 Edgewater Drive, Vermilion, Ohio 44089; Leo Tobacman, 2495 Eaton Road, University Heights, Ohio 44118

[22] Filed: Nov. 19, 1973

[21] Appl. No.: 416,922

[52] U.S. Cl. .................... 244/134 A; 137/625.64
[51] Int. Cl. ............................................. B64d 15/18
[58] Field of Search ........ 244/134 R, 134 A, 134 B; 137/612.1, 625.35, 625.64; 417/185, 186, 187

[56] References Cited
UNITED STATES PATENTS

| | | | |
|---|---|---|---|
| 2,515,519 | 7/1950 | Lawrence et al. | 244/134 A |
| 2,753,138 | 7/1956 | MacIntyre | 244/134 A |
| 3,263,702 | 8/1966 | Pullen et al. | 244/134 R |
| 3,720,388 | 3/1973 | Kaatz et al. | 244/134 A |

Primary Examiner—Trygve M. Blix
Assistant Examiner—Barry L. Kelmachter
Attorney, Agent, or Firm—Bosworth, Sessions and McCoy

[57] ABSTRACT

A valve mechanism to effect rapid changes of fluid pressure in a controlled fluid pressure system including, for example, airplane deicer boots. The pressures may change from a high vacuum to a few atmospheres, or from any desired low pressure to and from a relatively high pressure. The mechanism includes an inner housing comprising part of the controlled pressure system with opposite ports communicating respectively with high and low pressures, and interconnected closures opening one port while closing another. The body of the valve comprises first and second chambers which embrace respectively, opposite ends of the housing and the corresponding ports and closures. The first chamber is divided into near and far portions separated by a flexible diaphragm providing one of the closures, and is connected to the other, opening one port while closing the other. The outward annular part of the diaphragm is always exposed in the near portion of the chamber to high pressure and exposed in the middle of the same side to the different high and low pressures admitted to the housing. The whole of the other side of the diaphragm is exposed to different pressures in the far portion via a restricted orifice between the near and far portions and/or via a controlled vent to atmosphere. Opening the vent for the far portion drops the pressure therein to open the high pressure port, close the low pressure port and feeds high pressure fluid to the system. Closing the vent raises the pressure in the far portion via the bleed orifice, closes the high pressure port, opens the low pressure port and evacuates the system. The vent may be controlled manually, or in predetermined cycles, or in response to selected conditions as may be desired.

16 Claims, 8 Drawing Figures

PATENTED JUN 24 1975 3,891,164

SHEET 1

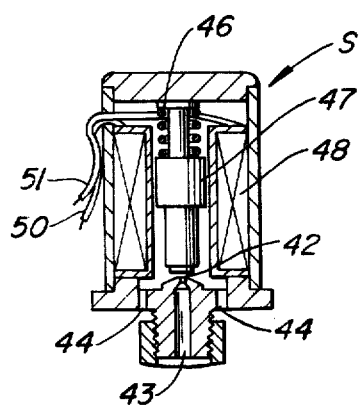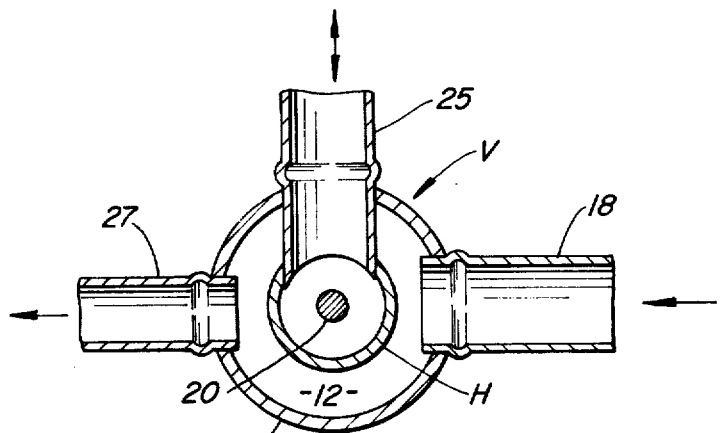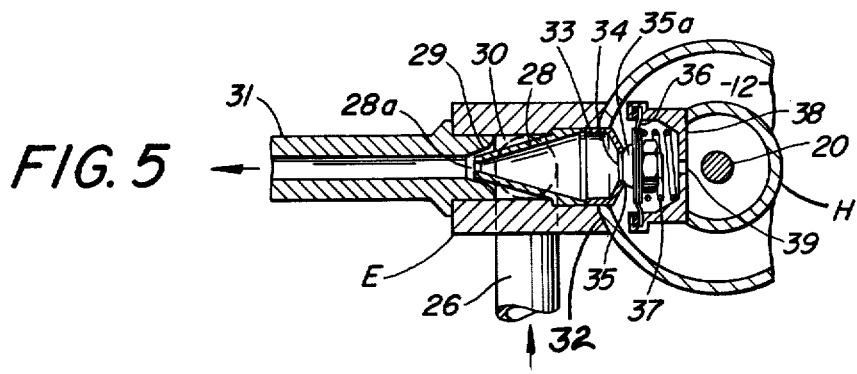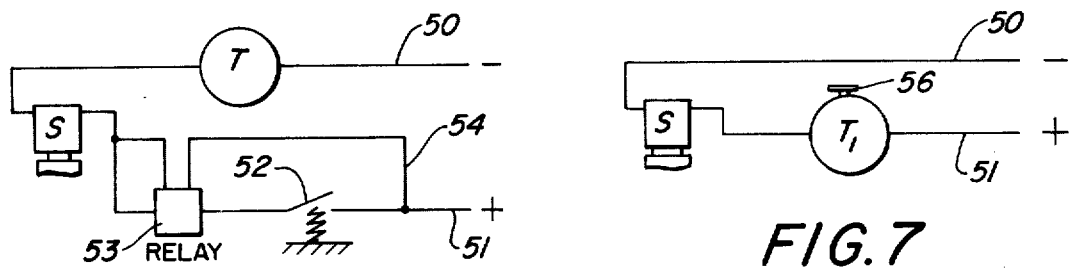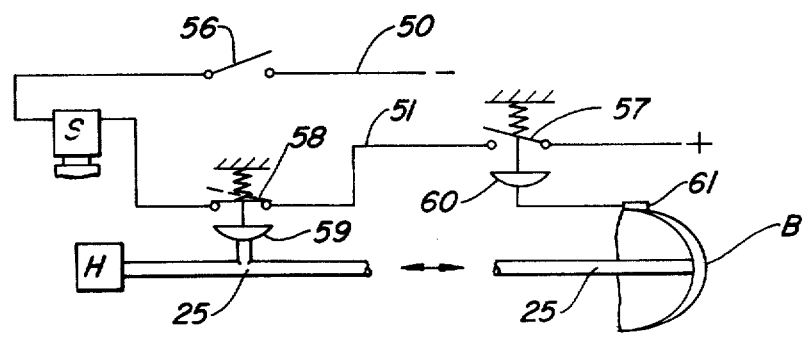

DUPLEX VALVE

BRIEF SUMMARY OF THE INVENTION

Our invention is addressed to solving the problem of making quick and efficient changes of fluid pressure as, for example, in a dead end pressure system from a few inches of mercury to two or three atmospheres, for such use as inflating and deflating deicer boots on airplanes. If a deicer boot in its inflated condition were to be encased in ice, as when its deflation is delayed or effected too slowly, the ice coating around the boot may become irremovable and cumulative. Our invention accomodates the ideal deicing cycle wherein a significant layer of ice is permitted to form on the tightly deflated boot which is then suddenly inflated whereby to break up the ice layer abruptly and dispense all the accumulated ice from the boot and nearby wing surface. Then the boot must be deflated quickly before another layer of ice can form on the inflated boot or boots. The uses and accomplishments of our invention are not confined to inflating or deflating deicer boots, nor to the kinds of pressures and relative pressures suitable for that purpose.

Our invention in a preferred form provides and utilizes a source of high pressure (1) to create, generate and maintain a place, source or condition of low pressure, and (2) provides a duplex valve to switch a closed pressure system from communication or incorporation with the high pressure source, or, alternatively, the low pressure place, source or condition.

An object of our invention is to provide a simple and efficient means for actuating said duplex valve rapidly, using the power available from the high pressure source to operate the valve, i.e. to actuate the valve closures (simulanteously and oppositely) to effect changes in the closed pressure system from high to low and low to high as may be desired, or in a predetermined cycle, or in a system of variable volume.

Our invention in its preferred form employs a central cylindrical housing ported at opposite ends to communicate alternately with high and low pressure sources respectively. Said housing is also open at all times to and comprises part of the closed pressure system controlled by the valve. Our duplex valve has interconnected closures for said ported ends of the housing. Separate chambers enclosing each end of the housing are also provided. One encloses the low pressure end of the housing and the closure therefor, is connected to the source of low pressure and has a check valve opening to atmosphere when, and so long as, boot pressure discharging into said chamber exceeds atmospheric pressure. The chamber enclosing the high pressure end of the housing is divided by a flexible diaphragm into near and far portions. The diaphragm comprises or carries the closure for the high pressure port and has an effective differential area acting to close the port when the pressure in the far portion equals or approaches the pressure of the high pressure source. A restricted bleed orifice connects the near and far portions. The near portion communicates directly with the source of high pressure and is ready for quick discharge of high pressure fluid into the system when the high pressure port of the housing is open and the low pressure port closed. When the high pressure side of the system is raised to the pressure of the high pressure source, the bleed of high pressure into the far side of the chamber tends to close the high pressure port and open the low pressure port.

It follows that an object of our invention is to control the pressure in the far side of the high pressure chamber, and thus the pressure in the whole system. In our preferred form this is accomplished by a solenoid actuated vent valve, having an opening larger than said bleed orifice, the opening of which dumps the fluid in said far portion of the high pressure chamber to atmosphere, opens the high pressure port and closes the low pressure port.

It is another object to provide means to close the said vent valve so that the high pressure bleeding into the far portion of the chamber will move the disphragm to close the high pressure port, open the low pressure port and evacuate the pressure system and collapse the boot or boots if such are included in the system.

Another object is to stop the generation of low pressure or vacuum when and while the high pressure fluid is being used to inflate the boots when that is desired.

Another object is to provide a duplex valve for changing pressure in a pressure system quickly, the actuation of which may be caused to respond to one or more of a variety of conditions, such as the establishment of desired high pressure in the system or the establishment of desired low pressure or the maintenance of any condition for a predetermined time.

BRIEF DESCRIPTION OF THE DRAWINGS

FIG. 3 is a vertical section of the solenoid vent valve included in the valve assembly of FIG. 1.

FIG. 4 is a horizontal section through the valve and parts of the inlet and outlet conduit of the assembly of FIG. 1 taken in the plane of the lines 4—4.

FIG. 5 is a horizontal section also taken in the plane 4—4 of FIG. 1 but extending also through the ejector of FIGS. 1 and 2 and including an ejector shut-off valve which may be employed to stop the flow of high pressure fluid to the ejector when high pressure fluid is employed to raise the pressure in the system.

FIGS. 6, 7 and 8 are diagrammatic views suggesting respectively different circuits, switches, timers and pressure and temperature responsive devices to effect different actuating and cyclical controls for the valve.

DETAILED DESCRIPTION OF THE PREFERRED FORM OF OUR INVENTION

Figure 1:
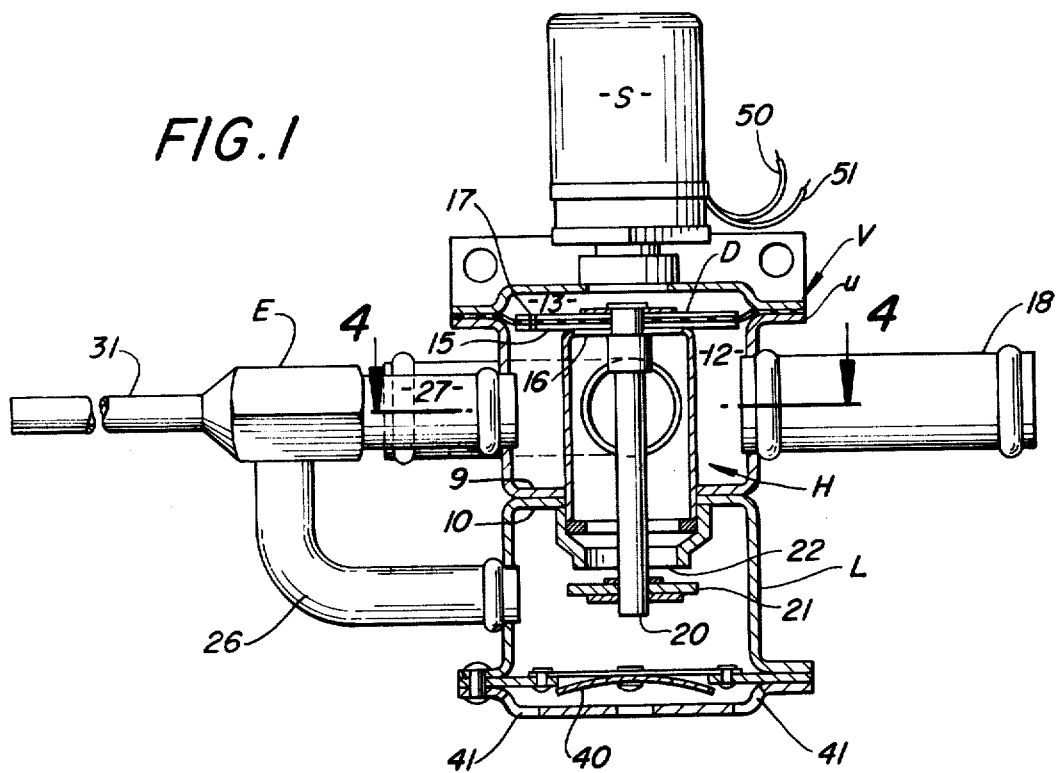
FIG. 1 is a side elevation, of our valve and assembly of related conduits and instrumentalities with the valve shown in vertical section.

As shown in FIGS. 1 and 4, our duplex valve V comprises an inner housing H, the upper, high pressure end of which is contained in a coaxial, upper, first chamber U, and the lower, low pressure end of which is contained in a coaxial, lower, second chamber L. Inwardly extending flanges 9 and 10 of the chambers U and L have fluid tight attachment to the outside of the midportion of the housing to segregate the fluids and pressure of each chamber from the other.

Chamber U comprises a lower or near portion 12 and an upper or far portion 13 separated from each other, by a flexible pressure responsive diaphragm means D that carries on its lower face a closure 15 for the upper end of the housing comprising the port 16.

A bleed orifice 17 perforates the diaphragm and tends to equalize the pressures in the chambers 12 and 13. When the uppper port 16 is closed as shown in FIG. 1 the pressure of high pressure fluid from the high pressure source, not shown, is communicated to the near portion 12 of the chamber U via input conduit 18, and so long as the port 16 is closed the same pressure tends to be developed in the far portion 13 via the bleed orifice 17.

The diaphragm D has secured in its center a central pin or link 20 the lower end of which carries the closure 21 engageable to close the lower port 22 on the housing H. When the diaphragm is displaced upwardly its travel is limited by the engagement of the closures 21 with the port 22. In the upward disposition of the diaphragm the port 16 is opened to establish communication between the input conduit 18 and the two-way conduit 25 through which is moved high pressure fluid to the controlled system, or deicer boots, and when the port 16 is closed as shown in FIG. 1 fluid is moved through conduit 25 to evacuate the system through the lower port 22 of the housing. The double headed arrow in FIG. 4 suggests the going and coming movements of fluid and pressures in this system are made and changed.

Figure 2:
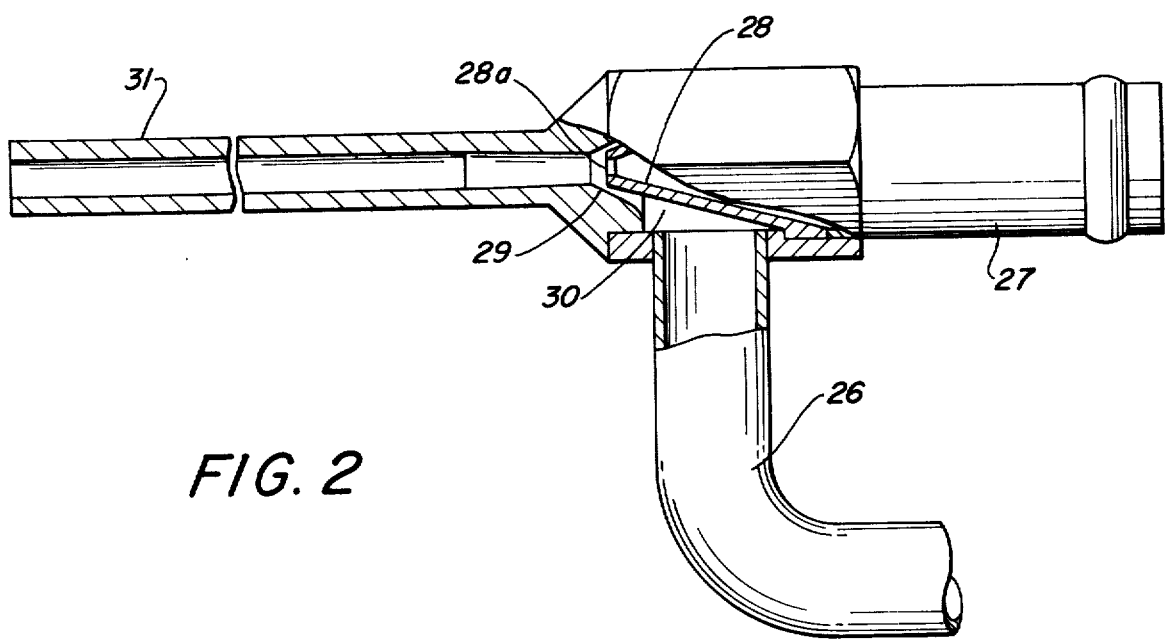
FIG. 2 is a side elevation, partly in longitudinal section of the ejector included in the valve assembly of FIG. 1.

The pressure in the lower chamber L is maintained low or lower than atmospheric, by suction developed in the ejector E, see also FIG. 2, which tends to withdraw air or other fluid from the chamber L through the low pressure conduit 26. The ejector develops its suction conventionally by virtue of the flow of fluid from the near portion 12 of chamber U through the valve outlet conduit 27 and the tapered restriction 28 and orifice 28a giving high velocity to the flow through the venturi 29 and creating a state of low pressure in the chamber 30 upstream of the orifice 28a of the restriction 28. The chamber 30 communicates with the chamber L through the low pressure conduit 26. Air or other fluid evacuated from the chamber L is discharged to atmosphere, or some other or ambient place of relatively low pressure, through the small discharge conduit 31 leading from the ejector.

To eliminate all outflow from the chamber portion 12 at the time when it is desired to raise the pressure in the system most rapidly, an alternate form of outlet from chamber 12 to ejector E is provided and illustrated in FIG. 5.

In this FIG. 5 form of our invention the upstream end 32 of ejector E is curved and formed to fit the exterior wall of the near portion 12 of the chamber U with the axis of the ejector aligned preferably with the axis of inlet 18. The curved end of the ejector is secured, brazed or bonded fluid-tight to the said wall. Upon the upstream end of the tapered restrictor 28 is mounted an annular valve seat element 33 having an outer cylindrical portion entering and fitting in a circular hole in said wall of the chamber U. Element 33 also has an inner conical part with a central, coaxial orifice 34 comprising the inlet opening of the ejector, the periphery of which comprises the valve seat 35 for a coaxial, coacting valve closure 35a. Seat 35 and closure 35a comprise the ejector valve. The closure 35a is carried by a flexible, coaxial, pressure responsive diaphragm 36 which is biased toward closing the valve by a spring 37 stressed between the diaphragm and the "bottom" of a cup-shaped element, hereinafter, cup 38. The periphery of the diaphragm 36 is secured fluid-tight in an annular groove at the brim of the cup. The exterior of the "bottom" of the cup 38 is seated and secured fluid-tight in the wall of the housing H and has an aperture 39 affording free communication between the housing and the interior of the cup.

The brim of the cup 38 is spaced from the interior face of the wall of the near portion 12 of chamber U whereby the outwardly disposed face of diaphragm 36 is always exposed to the high pressure fluid in near portion 12 which tends to open the valve 35-35a against the bias of spring 37 and the pressure in housing H.

Referring now also to FIG. 1, when pressure in chamber portion 12 is the same, or about the same, as that in housing H, spring 37 will hold the ejector valve closed and prevent loss of high pressure fluid through the ejector. When and as the pressure in the housing H falls enough to let the bias in spring 37 be overcome by pressure in chamber portion 12, the ejector valve will open and cause the ejector to suck fluid from chamber L and from the whole closed system and the boot or boots, if any, therein. Preferably the bias in spring 37 will assure that ejector forcing flow of high pressure fluid will not be diverted to the ejector during the period when high pressure is most wanted to fill the system and inflate the boots. Similarly the bias in spring 37 will assure that the ejector valve will be opened and a forcing flow of high pressure fluid will be passed through the ejector to cause it to evacuate the system and deflate the boots rapidly.

However, when housing port 16 is closed and housing port 22 is opened and high pressure fluid discharged from the system by its own force through housing H, chamber L and relief and check valve 40 to ambient atmosphere, there will be no worthwhile advantage in causing the ejector to suck fluid out of chamber L so long as the pressure therein maintains a greater outflow therefrom through valve 40 than the ejector could improve upon significantly through conduit 26. As a practical matter, opening the ejector valve when the static pressure in housing H is a little above ambient atmospheric pressure would tend to waste little high pressure air through the ejector and effect a desirably rapid evacuation of the closed system.

It would appear that the ejector valve should be closed ideally before the pressure in housing H exceeds atmospheric or a pound or so above it, but as a practical matter it takes so much less time to make the initial rise in pressure in the system than to gain the last desired increment of it, that closing of the ejector valve at a pound or so above atmospheric will still save the greater loss through the ejector and eliminate all loss at the more critical time. Moreover when the volume of the whole system is smaller at low pressure than at high pressure, as when inflatable deicer boots are included, the pressure will rise quickly in the system while at low volume and close the ejector valve promptly and hold it there while the expanded system is filling and being raised to its ultimate pressure.

It will now have appeared that opening and closing of the ports 16 and 22, and the control thereof, underlies the utility and advantage of our duplex valve. It has been suggested above that the pressure in the far portion 13 of the upper chamber U exerted on or withdrawn from diaphragm D moves the closures 15 and 21 simultaneously to open and close, or close and open, respectively, the ports 16 and 22. It remains to describe how this is done and to illustrate different ways of effecting and controlling it.

Referring to FIGS. 1 and 3, a vent orifice 42, FIG. 3, is disposed at the upper end of passage 43 which leads from the far portion 13 of chamber U above the diaphragm. When the vent is opened, fluid from portion 13 may escape to ambient pressure, or atmosphere as the case may be, through passages 44 and drop the pressure from the top of the diaphragm to open upper port 16 and close lower port 22 and fill the system with high pressure fluid. Closing the vent 42 causes the pressure on top of the diaphragm to rise and close port 16 and open port 22 by virtue of the flow of high pressure fluid through the balancing orifice 17, FIG. 1, and evacuate the system. When the volume of the system is variable, as when deicer boots are included, filling the system includes enlarging it and evacuating the system includes reducing the size of it.

It is in keeping with our invention to employ any practicable or convenient means to open and close the vent 42. Presently it is our preference that a normally closed solenoid S, FIGS. 1 and 3, be employed for this purpose. As shown, in FIG. 3 particularly, a spring 46 presses the armature-plunger 47 downwardly upon the vent orifice 42 and maintains the same closed until the coil 48 of the solenoid is energized to lift the armature-plunger 47 up off the orifice 42 to let fluid escape therethrough. Electrical leads 50 and 51 conduct current through the coil 48 as from an appropriate source of direct current, not shown.

Circuitry for operating the solenoid S to advantage in our invention is illustrated diagrammatically in FIGS. 6, 7 and 8.

In FIG. 6, leads 50 and 51 extend from solenoid S to negative and positive terminals of a D.C. source. In lead 51 a manual push, spring-biased, normally open switch 52 permits manual closing and spring opening of the circuit and energization and de-energization of the solenoid in the absence of relay 53 and clock or timer T. With the relay 53 and the shunt lead 54 included as shown in the circuit, continuous conduction through the circuit will be established and continued, timer T permitting, after switch 52 is closed and allowed to open. Assuming timer T is conductive when switch 52 is pushed closed, and conveniently released, the solenoid coil 48 is energized, vent 42 opened, diaphragm D raised, port 16 opened and port 22 closed whereby high pressure is imposed upon the system for such a period of time as timer T permits or requires. If deicer boots in the system are being inflated, timer T will keep the circuit closed only long enough for the boots to break and disperse the ice on and near them whereupon deflating is desired and initiated upon closing vent orifice 42. Therefore timer T is set to open the circuit promptly, as in a few seconds for example, and close vent 42. This evacuates the system and boots and maintains the low pressure condition until the operator or pilot pushes switch 52 again. Relay 53 may be assumed to open when timer T opens the circuit.

It follows that if the circuit contained only solenoid S and switch 52 the same result could be obtained by holding switch 52 closed for the length of time the high pressure condition is desired in the system. Opening switch 52 would restore the low pressure condition.

A simple timer controlled circuit is shown in FIG. 7 wherein the coil of solenoid S is energized and de-energized entirely by a timer or clock $T_1$ in lead 51 which is turned "on" and "off" by push button 56. Timer $T_1$, like a conventional traffic light control, may be set as desired to provide selected periods of high pressure alternating with periods of low pressure in the controlled system, space and/or boots.

In FIG. 8 we have intended to show and suggest how the solenoid S may be energized and de-energized in response to illustrative conditions in a controlled pressure system as the same may relate to a deicer boot, for example. Here a simple single pole manually opened and closed switch 56 is disposed in lead 50 which, however, will not energize solenoid S unless the conditions shown and suggested in lead 51 are also fulfilled. Opening switch 56 keeps solenoid S de-energized when that condition is desired to be established.

In lead 51, normally closed, spring biased switch 58 is openable in response to any selected fluid pressure in conduit 25 via fluid motor 59 which reflects the pressure in the controlled space and system as between housing H and deicer boot B. When the pressure in conduit 25 rises to a selected value, switch 58 is opened, and, if lead 51 is otherwise unbroken, solenoid S will be de-energized, pressure built up in far portion 13 of chamber U, high pressure port 16 closed, and low pressure port 22 opened to evacuate the system and collapse boot B.

To illustrate that the control may be responsive to a further condition relating to boot B, normally open, temperature responsive switch 57 is also included in lead 51, i.e., in series with switches 58 and 56. A spring, as shown, urges switch 57 to closed position against the resistance of fluid motor 60 connected to thermometer bulb 61 containing fluid, the pressure of which decreases as bulb temperature lowers. Thus the condition for closing switch 57 is that the temperature adjacent boot B has reached or reflects at least one icing condition in the absence of which the solenoid will be or remain de-energized and the boot remain deflated. Those familiar with other factors comprising icing conditions will appreciate that appropriate instrumentalities responsive to such factors may also be employed to influence the energizing, and possibly also the de-energization of the solenoid S.

In the foregoing description the terms "superatmospheric" or "superambient," and "subatmospheric" or "subambient" or "vacuum" have been or may be used variously to describe the high and low pressure states in the controlled space or system to which our invention pertains. Also the terms atmospheric and/or ambient have been, or may be used appropriately to designate the environmental conditions outside the said controlled space or system.

Discharge to atmosphere or ambience as used variously herein is intended to comprehend discharge to such relatively low or intermediate pressures compared with the high pressure being described or claimed that a vigorous discharge is assured regardless of the absolute or gauge pressures of the high and low conditions employed in our controlled space or system.

While we have described our preferred, and certain modified, forms of our invention, we do not want to be limited in the scope of our patent to the form or forms specifically disclosed herein nor in any manner inconsistent with the progress by which the art has been promoted by our invention.

What is claimed is:

1. A duplex valve for changing fluid pressure in a confined space quickly, said space including an inner cylindrical housing having ports spaced at opposite ends, a first port at one end and a second port at the opposite end, closures for said ports for opening said first port and closing the second, pressure responsive means for moving said closures, a first chamber embracing said means, one of said closures and a first of said ports and being divided into near and far portions by said means, a bleed orifice between said portions tending to balance the pressure therein, a second chamber embracing the other of said closures, and the second of said ports, a source of high pressure communicating with said near portion, a source of low pressure communicating with said second chamber, a controlled vent from said far portion to a region of relatively low pressure compared with said high pressure, means for opening said vent to bias the pressure exerted on said pressure responsive means to open said first port and admit fluid under high pressure to said housing and said space, and means for closing said vent to close said first port and open said second port to evacuate said space, each closure being removed from the flow of fluid through the opposite port.

2. The valve of claim 1 wherein the near portion of said first chamber has an outlet, an ejector supplied by said outlet to produce said low pressure and fluid conducting means leading said low pressure to said second chamber.

3. The valve of claim 2 with an ejector valve in said outlet ahead of said ejector, said ejector valve having a pressure responsive diaphragm exposed to pressure in said near portion on one side and exposed to pressure in said housing on the other side and being biased toward closed position when said first port is open and fluid from said near portion is flowing through said first port into said space.

4. The valve of claim 3, wherein said second chamber has a relief valve opening to said region when pressure higher than that in said region rises in said second chamber, said ejector valve being forced to open position when said first port is closed and said second port is opened and the pressure in said housing and said second chamber tends to fall to the pressure in said region.

5. The valve of claim 1 wherein said space includes a deicer boot and said means for opening and closing said vent is responsive to predetermined conditions of pressure in said boot, said means comprising a solenoid which is energized by a pressure actuated switch responsive to the pressure in said boot.

6. The valve of claim 5 in conjunction with a normally closed pressure switch subject to boot pressure to signal the solenoid to close said vent and exhaust said boot to ambient pressure.

7. The valve of claim 1 wherein said means for closing said vent is actuated in response to increased pressure in said space.

8. A valve according to claim 1 wherein said pressure responsive means has a greater area exposed to pressure in said far portion than is exposed to high pressure in said near portion and the area of said pressure responsive means exposed to said high pressure in said near portion is sufficient to open said first port of said housing against low pressure in said housing acting on said closure at said first port.

9. A deicer valve adapted to supply a deicer boot with air at rapidly changing pressure as from above to below ambient pressure, the valve having a central housing open at spaced ends and communicating with said boot from between said ends, closures for said ends, means for moving said closures simultaneously to open one end and close the other, separate first and second chambers containing respectively each end of said housing and a closure therefor, a diaphragm in said first chamber comprising a first closure for a first open end of said housing and dividing said chamber into near and far parts and said diaphragm having an annular area surrounding said first open end and having a bleed orifice tending to equalize pressure in said parts of said chamber, the near part of said chamber communicating with super ambient pressure, said diaphragm having a greater exposed working area in the far part of said chamber than said annular area and having a vent to ambience, a solenoid valve normally biased to close said vent, the second chamber containing the second open end of said housing and the second closure and having a relief and check valve opening to ambience and communicating with subambient pressure tending to close said relief and check valve, said second closure admitting subambient pressure to said boot while said vent is closed, the opening of said vent admitting super ambient pressure to said boot, and closing said vent evacuating said boot.

10. The deicer valve of claim 9 with means comprising a solenoid which is spring biased to close said vent and a pressure responsive switch responsive to inflation of said boot to de-energize said solenoid and close said vent and deflate said boot.

11. The deicer valve of claim 9 with an ejector having a pressure inlet for superambient motivating fluid communicating with said near part of said first chamber and having its suction inlet connected to said second chamber, a spring-biased shut-off valve for said pressure inlet biased toward closed position, and fluid motor means for actuating said shut-off valve comprising a diaphragm subjected on one side to the pressure in said near part in opposition to said spring bias and subjected on the opposite side to the changing pressures in said housing.

12. A duplex deicer valve for changing the volume and pressure of air in a deicer boot quickly comprising a central cylindrical housing having a side outlet leading to the boot and having axially spaced opposite end openings comprising inlet and outlet ports respectively, inlet and outlet closures for said ports respectively, separate first and second chambers containing respectively the inlet port and closure at one end of the housing and the outlet port and closure at the other end of the housing, a source of high pressure having a fluid connection with said first chamber, an outlet from said first chamber, an ejector in said outlet fed by high pressure fluid from said first chamber, a fluid connection between the suction side of said ejector and said second chamber for sucking air from said housing, means for opening the inlet port of said housing and closing the outlet port thereof for moving air to and increasing the pressure in said housing and said boot, means for opening said outlet port of said housing and closing the inlet port thereof for decreasing the pressure in said housing and boot, means responsive to changes in pressure in said housing relative to the pressure in said first chamber for feeding high pressure air to and diverting high pressure air from said ejector.

13. The deicer valve of claim 12 wherein said ejector has an inlet for said high pressure fluid from said first chamber, and wherein said feeding means comprise a shut-off ejector valve for said inlet biased toward closed position, and fluid motor means for actuating said shut-off valve comprising a diaphragm subjected on one side to the pressure in said first chamber in opposition to said bias and said diaphragm is subjected on the opposite side to the changing pressures in said housing.

14. A duplex deicer valve comprising a central, substantially cylindrical, elongated housing having a vertical axis, an inlet port at its upper end normal to said axis, an outlet port at its lower end normal to said axis and spaced remotely from said inlet port, inlet and outlet closures for said ports respectively, a central link connecting said closures and spacing them apart more than said ports whereby to provide a full opening of one port when the other is closed, a passage from said housing to a deicer boot, an upper chamber portion enclosing the upper part of said housing, a flexible diaphragm overlying said inlet port and comprising said inlet closure and having an annular peripheral lower face exposed in said portion to fluid pressure therein tending to open said inlet port and close said outlet port, an intake passage for said portion from a source of high fluid pressure, and means for exerting pressure on the upper face of said diaphragm to close said inlet port and open said outlet port.

15. The valve of claim 14 wherein said chamber has an outlet, a valve for controlling the flow of fluid to said outlet, and fluid pressure responsive valve actuating means having fluid communication with the interior of said housing tending to close said outlet when the pressure of the fluid in said housing rises and tending to open said outlet when the pressure in said housing falls.

16. The valve of claim 15 with an ejector in said outlet having its suction side in fluid communication with said housing when the said outlet port thereof is open.

* * * * *